UNITED STATES PATENT OFFICE.

PHILIPP OTT, OF ELBERFELD, GERMANY, ASSIGNOR TO THE FARBENFABRIKEN, VORMALS FR. BAYER & CO., OF SAME PLACE.

GREENISH-BLUE DYE.

SPECIFICATION forming part of Letters Patent No. 498,404, dated May 30, 1893.

Application filed January 19, 1893. Serial No. 458,902. (Specimens.) Patented in France April 28, 1892, No. 221,233, and in Italy June 24, 1892, XXVI, No. 32,191.

*To all whom it may concern:*

Be it known that I, PHILIPP OTT, doctor of philosophy, chemist, (assignor to FARBENFABRIKEN, VORMALS F. BAYER & CO., of Elberfeld,) a subject of the Emperor of Germany, residing at Elberfeld, Germany, have invented a new and useful Improvement in the Manufacture of Coloring-Matters, (for which the aforesaid FARBENFABRIKEN have already obtained Letters Patent in the following countries: France, No. 221,233, dated April 28, 1892, and Italy, Vol. XXVI, No. 32,191, dated June 24, 1892,) of which the following is a specification.

My invention relates to the production of a new disazo dye-stuff by combining a diazo benzene salt with the so called Clève's alpha-naphthylamine beta monosulpho acid (beta or delta, described in the *Bulletin de la Société Chimique*, Vol. 26, page 447, and *Berichte der Deutschen Chemischen Gesellschaft*, Vol. 21, page 3264) in equal molecular proportions, by rediazotizing the amidoazo compound thus produced and coupling the resulting diazo derivative with the so called paratolylalphanaphthylaminealphamonosulpho acid (1:8), likewise in equal molecular proportions.

In order to produce the last named paratolylalphanaphthylamine alpha monosulpho acid (1:8), I heat for instance, one part, by weight, of alpha naphthylamine alphamonosulpho acid (1:8) with four parts, by weight, of paratoluidine and one part, by weight, of paratoluidine hydrochlorate for about ten hours at a temperature from about 160° to 180° centigrade. Then I treat the resulting mixture with diluted acids and purify the paratolylalphanaphthylamine monosulpho acid precipitated in this manner by redissolving in sodium carbonate and subsequently decomposing the alkaline solution with acids.

In carrying out my process practically I proceed as follows: 1.3 kilos, by weight, of aniline hydrochlorid or the corresponding quantity of another aniline salt or of this free base are diazotized in the known manner, for instance, by means of 0.7 kilos, by weight, of sodium nitrite in moderately acid solution. The resulting diazo solution is allowed to flow into a solution in water, of 2.45 kilos, by weight, of the sodium salt of Clève's alpha naphthylamine beta monosulpho acid (beta or delta acid) and about five kilos, by weight, of sodium acetate. After some days the mixture is heated for a short time at from 60° to 70° centigrade. When the formation of the amidoazo compound is complete, the latter is precipitated by rendering alkaline and salting out and is filtered off. It is then mixed with a small quantity of water and, after adding a concentrated watery solution of 0.7 kilos, by weight, of sodium nitrite, the liquid mixture is acidulated by means of muriatic acid, which is slowly added on cooling. The mass thus obtained is introduced into a solution prepared by dissolving in water 3.35 kilos, by weight, of paratolylalphanaphthylamine alpha monosulphonate of sodium and seven kilos, by weight, of sodium acetate. After some hours the mixture is heated for a short time at about 70° centigrade. Then, alkali is added and the complete dye-stuff thus produced is salted out by means of common salt, filtered off, pressed and dried.

My new coloring-matter having the following composition—

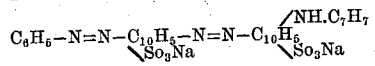

forms after drying and pulverizing a violet-black powder. It easily dissolves in water with dark blue color and is dissolved by alcohol with the same color. By ammonia it is dissolved with blue color, while it is almost insoluble in sodium carbonate and soda-lye, even on heating. In diluted mineral acids, such as for example muriatic acid or sulfuric acid, it is likewise insoluble. On adding to its watery solutions ammonia or sodium carbonate the color of the solutions is not altered; only, when an excess of ammonia or sodium carbonate is employed, blue or reddish-blue flakes are separated; an addition of soda-lye to its solutions in water causes a precipitation of the dye-stuff in dark blue flakes. When mineral acids are added to its solution in water, the color is changed into bluish-green, and gradually bluish-green flakes are separated. By concentrated sulfuric acid it is dissolved with dark blue color, which on the addition of ice or icy water becomes at first green, while an excess of water turns the color of the sulfuric acid solution into greenish-blue and after some time greenish-blue flakes are separated. It is adapted for dyeing wool without or with the aid of mordants and produces greenish-blue shades which are fast against the action of washing, fulling, light and alkalies. It differs from the dyestuff which is described by me in a separate specification, Serial No. 459,911, and formed by combining the diazo derivative of the amidoazo compound from equal molecular proportions of a diazo benzene salt and Clève's alphanaphthylamine beta monosulpho acid (beta or delta acid) with phenylnaphthylamine sulpho acid obtained by heating alphanaphthylamine monosulpho acid (1:8) with aniline and a salt of this base, as this latter coloring-matter contains a phenyl group in place of the tolyl group contained in the product of this specification and generally yields on wool redder shades.

Having thus described my invention and in what manner it can be performed, that which I claim as new, and desire to secure by Letters Patent, is—

1. The process of producing a new coloring-matter by combining equal molecular proportions diazotized aniline and Clève's alpha-naphthylamine beta monosulpho acid diazotizing the formed benzene azo alpha naphthylamine beta monosulpho acid and coupling the obtained diazo compound with para-tolylalphanaphthylamine monosulpho acid obtained from alpha naphthylamine monosulpho acid (1:8) and paratoluidine, substantially as herein described.

2. As a new product the coloring-matter having the formula—

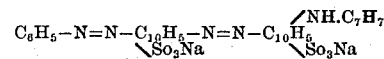

forming a violet-black powder, soluble in alcohol and ammonia with blue color; soluble in water with dark-blue color, which does not change on addition of ammonia or sodium carbonate, but its aqueous solution separates on addition of an excess of ammonia or sodium carbonate blue or reddish-blue flakes; on addition of soda-lye its aqueous solution separates dark blue flakes, and on addition of mineral acid to its aqueous solution turns into bluish-green, and gradually separates bluish-green flakes; soluble in concentrated sulphuric acid with dark-blue color, which on addition of a little ice-water changes first into green, and on addition of an excess of ice-water changes into a greenish-blue, separating finally greenish-blue flakes; almost insoluble in sodium carbonate and soda-lye, even on heating; insoluble in dilute mineral acids, such as hydrochloric or sulphuric acids; dyeing wool with or without the aid of mordants greenish-blue; and having the qualities substantially as specified.

In testimony whereof I have signed my name in the presence of two subscribing witnesses.

PHILIPP OTT.

Witnesses:
W. M. ESSENWEIN,
RUDOLPH FRICKE.